United States Patent [19]

Barecki

[11] 4,249,769
[45] Feb. 10, 1981

[54] PASSIVE RESTRAINT FOR A VEHICLE
[75] Inventor: Chester J. Barecki, Grand Rapids, Mich.
[73] Assignee: American Seating Company, Grand Rapids, Mich.
[21] Appl. No.: 3,668
[22] Filed: Jan. 15, 1979
[51] Int. Cl.³ .............................................. B60N 1/02
[52] U.S. Cl. ................................... 296/65 A; 297/216
[58] Field of Search .................... 296/63, 65 R, 65 A; 108/108, 152; 297/450, 216

[56] References Cited
U.S. PATENT DOCUMENTS

| 3,310,342 | 3/1967 | Drelichowski | 297/216 |
|---|---|---|---|
| 3,762,764 | 10/1973 | McJunkin | 296/63 |
| 3,802,738 | 4/1974 | Tantlinger | 297/450 |
| 4,109,959 | 8/1978 | Barecki et al. | 297/216 |
| 4,145,081 | 3/1979 | Withers | 297/216 |

Primary Examiner—John J. Love
Assistant Examiner—Ross Weaver
Attorney, Agent, or Firm—Price, Heneveld, Huizenga & Cooper

[57] ABSTRACT

An upper suspended cantilevered public transportation vehicle seat is provided including a passive restraint for absorbing the impact energy of a passenger during an accident or rapid maneuver. The vehicle seat includes a bench and an upstanding back portion, both the seat bench and back portions being supported by a sidewall of the vehicle. The seat bench is securely mounted to the sidewall of the vehicle. The upstanding seat back includes top and bottom portions, the bottom portion of the back depending from the seat bench. The top portion of the back is slidably, or pivotably and slidably mounted to the sidewall of the vehicle. This mounting arrangement allows the back of the cantilevered seat to deflect about the bench to absorb the impact energy of a passenger and prevent or reduce serious injury to the passenger during an accident or rapid maneuver.

17 Claims, 11 Drawing Figures

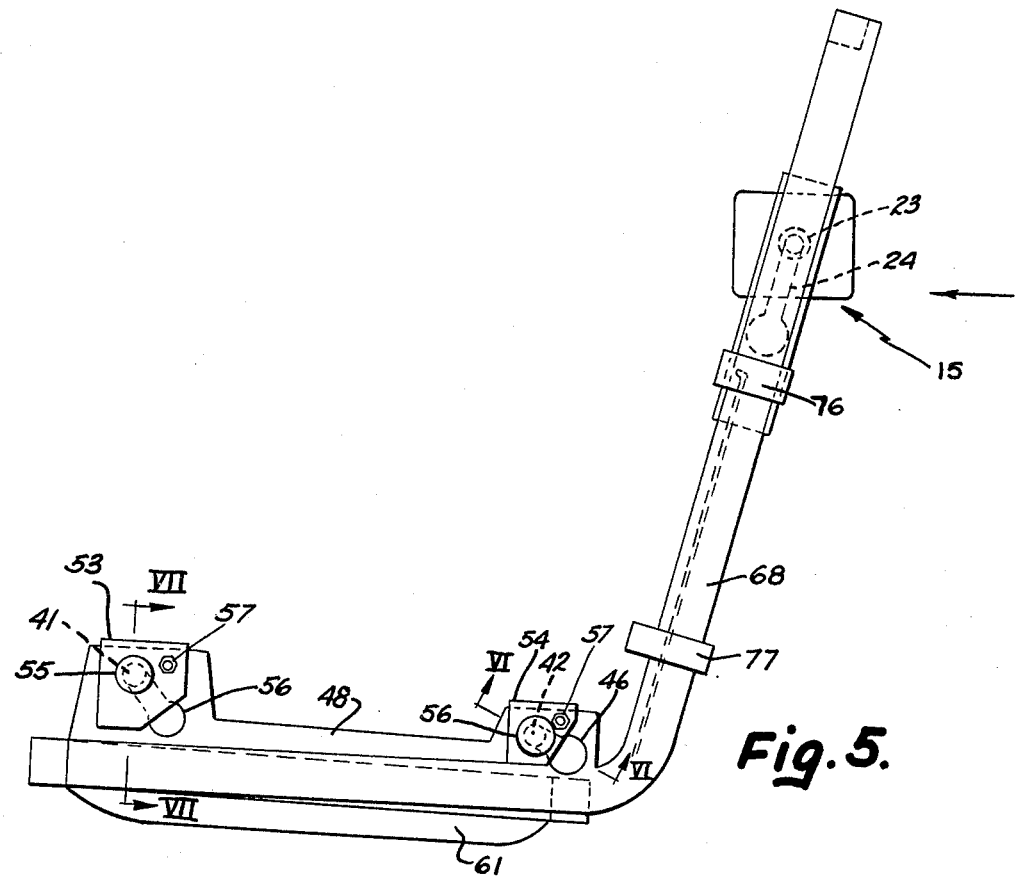
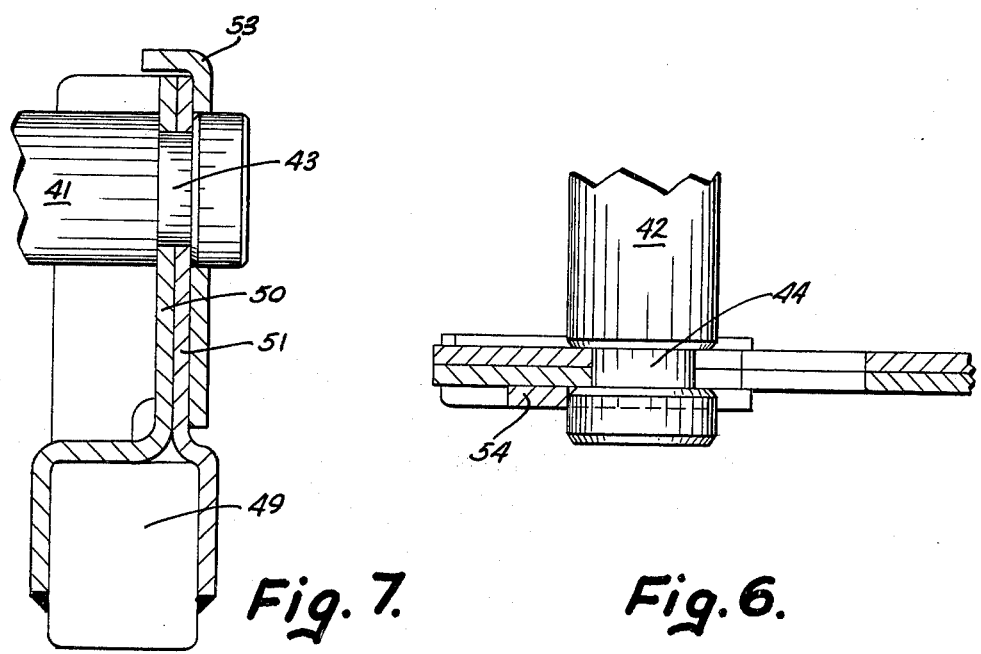
Fig. 5.
Fig. 7.
Fig. 6.

PASSIVE RESTRAINT FOR A VEHICLE

BACKGROUND OF THE INVENTION

This invention relates generally to public transportation seating and more particularly to an upper suspended cantilevered seat for a passenger carrying vehicle which is capable of absorbing impact energy imposed thereon by a passenger seated behind the seat during a crash or rapid maneuver.

In recent years efforts have been made to improve the crash worthiness of mass transportation vehicles such as school buses, city and interstate buses, trains and aircraft. Crash studies, particularly in the ground transportation industry, have shown that one of the major causes of injury to passengers in an accident is the result of being impacted or thrown into the vehicle seat structures. Many prior art seats fail to protect the passengers by being too weak, too low, or too hostile. In a conventional mass transportation vehicle such as a bus, passengers are thrown from their seats forwardly into the next adjacent seat. If the back seat of the next adjacent seat is too low, they could be catapulted over the top of the seat and impact the interior of the vehicle, with severe injury. Further, if the seat structure against which the impact occurs is too weak or is incapable of absorbing sufficient energy in a controlled manner, the seat structure may fail, similarly permitting the passenger to be thrown forward, resulting in severe injury. Efforts have been made to reduce the hostility of the seats by removing or redesigning grab rails or like structures of the seats which during a crash situation, could become blunt or sharp instruments capable of inflicting severe, and sometimes fatal injury to the passengers.

In the mass transportation industry, and in particular in buses, active restraint systems such as seat belts have not received ready acceptance, due primarily to the nature of the vehicles involved and their uses. Because of the large number of passengers using these vehicles, it is extremely difficult for a single operator to enforce the use of seat belts. Therefore, the trend, particularly in buses, has been to provide for crash worthiness with passive restraint systems.

In order to increase the safety of vehicles and in particular buses, efforts have been directed to arranging the interiors so that the passengers are compartmentalized. Each compartment includes an interior sidewall of the vehicle, the passengers own seat, and the seat immediately in front of the passenger. The design emphasis on the seats themselves is to provide a seat which is capable of absorbing impact energy in a controlled manner within certain levels so as to reduce or prevent the occurrence of, and severity of injuries to the passengers.

In an effort to provide crash protection, and in accordance with the mandate set forth in the National Motor Vehicle Safety Act of 1966, 15 USC, 1381, et seq., as amended by Public Law 93-492 in 1974, the Department of Transportation, Urban Mass Transportation Administration has issued a Base Line Advanced Design Transit Coach Specification which sets forth certain criteria relating to energy absorbtion and compartmentalization characteristics which must be met by public mass transportation vehicle seating. A separate criterian is set out for school bus passenger seating.

Attempts have been made to fabricate seats in accordance with the aforementioned criteria. Typically, these seats have employed large amounts of padding or energy absorbing material to meet the required standards. The resulting seats have been aesthetically unpleasing and possess the disadvantages of relatively high weight when compared to previously employed seats and relatively complex construction and bulkiness. These seats also suffer from relatively high cost of manufacture and installation.

The most successful prior art seats designed to meet these criterian have involved the use of a freestanding upright back structure which is deflectable upon impact for absorbing the impact energy of a passenger. Such a design may include a seat bench cantilevered from a sidewall of the vehicle or mounted on pedestals from the floor of the vehicle. In the prior art, pedestal designs have also been provided including additional energy absorbing means contained in the bench for allowing a certain amount of linear translation of the seat bench. Of these prior art designs, the cantilevered seating structures have become most desirable from several viewpoints. This type of seat eliminates the usual obstructions connecting the seat to the floor, such as legs, pedestals, aisle end bases or the like. An inportant advantage of such a cantilevered type seat is that a gang-type sweeper may be used to clean the entire width of the vehicle in a single sweep, thereby substantially reducing the time and cost of cleaning. There are however other advantages to cantilevered seats, including a more pleasant and neater appearance, greater facility of ingress and egress, elimination of stumbling hazards that legs or bases may contribute to passengers walking down a narrow aisle or exiting from the seat, and ease of retrieving articles from beneath the seats. The latter advantage stemming from the fact that an unobstructed view of the floor area is provided and the available light shines upon this unobstructed area. Furthermore, depending on the seat structure, there may be more room for storage of luggage beneath the cantilevered seat as well as increased area for the legs of the passengers located behind the seat.

Prior art cantilevered seating arrangements that have met the aforementioned energy absorbtion and compartmentalization criterian have been platform mounted lower support cantilevered seats. These prior art cantilevered seats employed a lower platform structure having a three point mounting arrangement for securing the bench portion of the seat to a sidewall of the vehicle. The platform was attached to the sidewall of the vehicle by two horizontally spaced attachment points with a third attachment point displaced vertically below the bench portion of the seat to triangularly brace the cantilevered seat bench. Prior art upper suspension type cantilevered seat structures with at least one mounting point disposed high on the seat back, in place of the triangulated platform structure, have been unable to meet appropriate safety standards on the window side of the seat.

SUMMARY OF THE INVENTION

The present invention provides an upper suspension cantilevered seat while meeting the aforementioned public mass transportation and school bus criterian for energy absorbtion and compartmentalization during an accident. That is, that in the event of an accident, seats constructed according to the present invention are flexible enough not to impart a substantial amount of energy to an occupant and yet are strong enough not to become detached if struck by a passenger. During an accident, these seats hold the passenger in a compartment or safety zone, protecting the passenger against flying objects and against his own gathering momentum.

Seating constructed according to the present invention includes a passive restraint comprising a generally upright planar deflectable structure for receiving the impact of a passenger during an accident or rapid maneuver. The bottom portion of the structure is securely mounted to the vehicle. The top portion of the structure is slidably mounted to the sidewall of the vehicle whereby the structure is free to deflect about the bottom portion to absorb the impact energy of the passenger, thereby preventing or reducing serious injury to the passenger during impact.

In more narrow aspects of the invention, such a passive restraint is incorporated in an upper suspension type cantilevered vehicle seat by providing a bench securely mounted to the sidewall of the vehicle, and an upstanding back depending from the bench. The bottom portion of the back is securely mounted on the bench portion of the seat. The top portion of the back is provided with means for slidably mounting the back to the sidewall of the vehicle. This arrangement eliminates the triangulated understructure of prior art cantilevered seat designs meeting the aforementioned safety criterian. Additionally, means for pivoting the top portion of the seat about the means for slidably mounting may be provided for preventing moments generated in the seat back from interfering with the operation of the means for slidably mounting during an impact.

BRIEF DESCRIPTION OF THE DRAWINGS

FIG. 5 is an end elevational view of the seat of FIG. 1.

FIG. 6 is a sectional view taken along line VI—VI of FIG. 5;

FIG. 7 is a sectional view taken along line VII—VII of FIG. 5;

DESCRIPTION OF THE PREFERRED EMBODIMENTS

Figure 1:
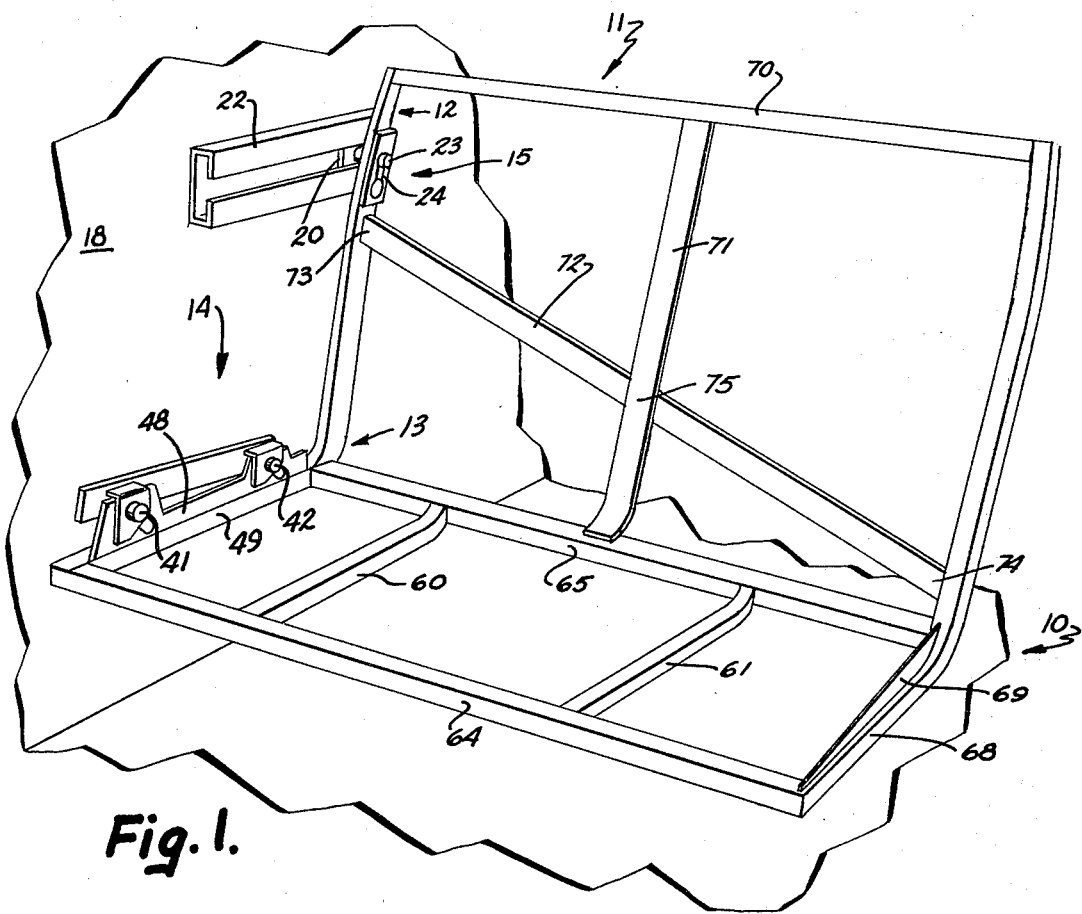
FIG. 1 is a perspective view of a cantilevered vehicle seat incorporating the passive restraint of the present invention.
Figures 2, 3:
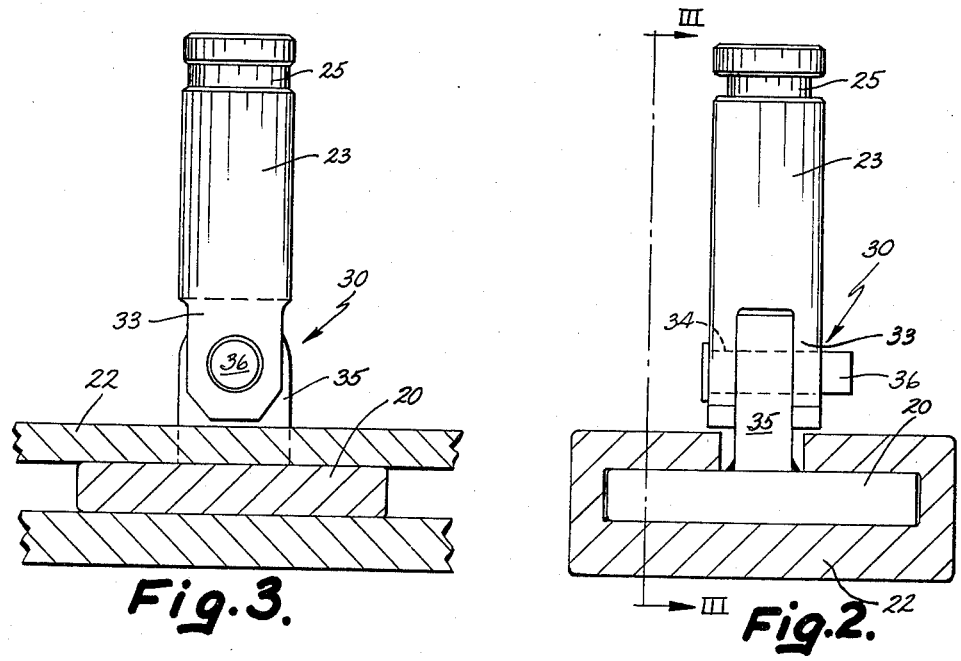
FIG. 2 is an elevational view partially in section of a sliding foot and pivoting pin employed to slidably mount the seat back illustrated in FIG. 1 to the sidewall of a vehicle.
FIG. 3 is a sectional view of the foot and pin of FIG. 2 taken along line III—III.
Figure 4:
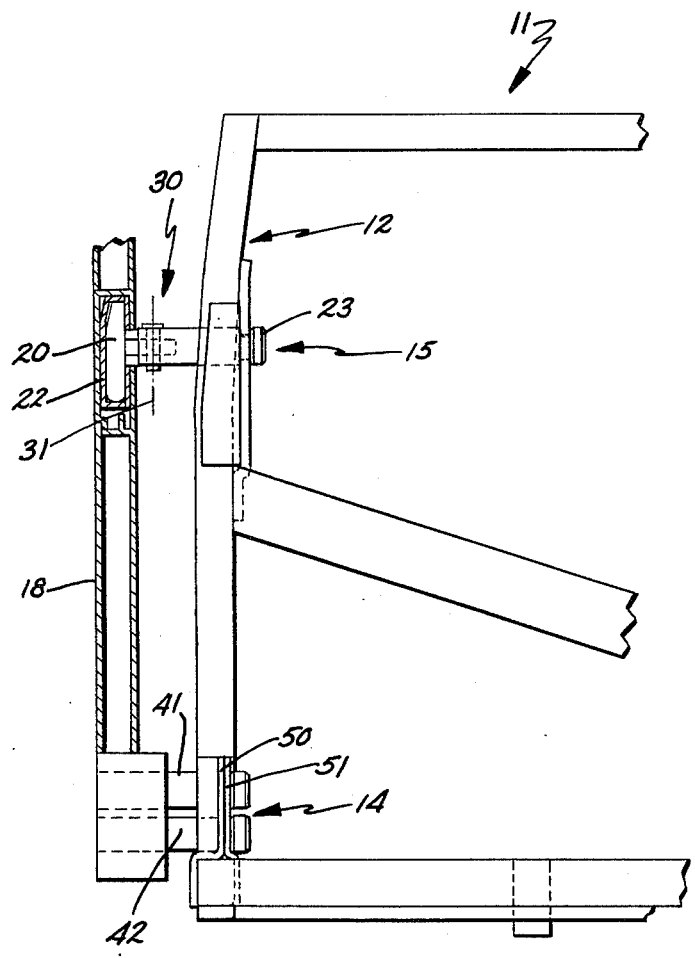
FIG. 4 is a front elevational view, partially in section, of the seat of FIG. 1.

Referring to FIG. 1, an upper suspension type cantilevered vehicle seat 10 is illustrated incorporating the passive restraint of the present invention. The seat 10 is illustrated in FIG. 1 without shell and padding so as to clearly illustrate the load bearing structure of the seat. It is to be understood that the passive restraint of the present invention need not be incorporated in a seat structure. For example, in the case of the frontmost seats in a transportation vehicle, a passive restraint constructed according to the present invention may be provided just ahead of the front seats to provide passengers in these seats with the same safety features provided to passengers sitting between rear seats.

In FIG. 1, the passive restraint for a vehicle comprises a generally upright planar, deflectable structure 11 for receiving the impact of a passenger during an accident or rapid maneuver. In this case, the upright, generally planar deflectable structure 11 comprises a seat back. The back 11 includes a top portion 12 and a bottom portion 13. First mounting means for securely mounting the bottom portion of the structure 11 to the vehicle is generally illustrated by the numeral 14. Second mounting means for slidably mounting the top portion 12 of the structure 11 to the sidewall of the vehicle is generally illustrated by the numeral 15. The second mounting means 15 allows the structure 11 to deflect about the bottom portion 13 of the structure to absorb the impact energy of a passenger, thereby preventing or reducing serious injury to the passenger during an accident or rapid maneuver. In FIG. 1, the second mounting means 14 comprises a bench of vehicle seat 10 securely mounted to a sidewall 18 of a vehicle. The generally upright planar deflectable structure 11 comprises a seat back depending from the bench 14.

Referring now also to FIGS. 2, 3, 4 and 5, the second mounting means 15 for slidably mounting the bench 11 to the side 18 of the vehicle is illustrated in further detail. The second mounting means 15 comprises a foot 20 connected to the top portion 12 of the bench 11, the foot 20 being adapted for slidable engagement with a generally horizontal channel 22 disposed in the sidewall 18 of the vehicle. In this case, the channel 22 is a horizontally extending channel such as the type normally used in transportation vehicles for freely arranging a plurality of seats with different spacing. However, it is to be understood that it may be preferable to provide a channel 22 that extends along an arcuate path. The foot 20 further includes a high post 23 extending in a direction generally orthogonal to the foot 20. In the case where a horizontally extending track 22 is employed, the second mounting means may further include a generally vertically extending keyway 24 disposed in the top portion 12 of the bench 11. The high post 23 includes a circumferential groove 25 that is slidably received in the keyway 24. The keyway 24 allows translation of the post 23 in a vertical direction when the seat back 11 is deflected during impact. This is essential in the case of a horizontally extending track 22 since during impact, the back 11 will deflect about its rigidly secured bottom portion 13 along an arcuate rather than a linear path. In the case where a curvilinear track 22 is provided, the track 22 would be provided with a radius which approximates the expected arcuate path of travel of the back 11 during impact.

The passive restraint of the present invention further includes means for pivoting the top portion 12 of the back 11 about said second mounting means 15 for preventing moments generated in the back 11, by impact of a passenger, from binding the sliding foot 20 in channel 22. In this case, the means for pivoting the top portion of the back 11 comprises a hinge 30 disposed in high post 23 between foot 20 and the circumferential groove 25 which engages the keyway 24. The hinge 30 preferably provides for pivoting movement of the back 11 about an axis 31, extending in a generally vertical orientation. In this case, the hinge 30 is formed by providing the end of the high post 23 opposite circumferential groove 25 with a bifurcated structure 33. The bifurcated structure 33 is provided with an aperture 34 extending therethrough. The bifurcated structure 33 encompasses an apertured hinge eye 35 which is normally welded, or otherwise suitably secured or formed, on the foot 20. A pin 36 extends through aperture 34 and the apertured eye 35 to pin the high post 23 to the foot 20.

In the present case, the first mounting means 14 for securely mounting the bottom portion 13 of the back 11 to the side 18 of the vehicle comprises a bench portion of a fully cantilevered seat 10. Referring now to FIGS. 1, 4, 5, 6 and 7, it is illustrated that the bench 14 is securely mounted to the wall 18 of the vehicle with a pair of low posts 41 and 42 rigidly mounted in the wall 18 of the vehicle in any suitable fashion. As best illustrated in FIGS. 6 and 7, the low posts 41 and 42 are provided with circumferential grooves 43 and 44, respectively. The low posts 41 and 42 engage a pair of horizontally displaced keyways 45 and 46, respectively. The keyways 45 and 46 are disposed in a horizontally extending gusset 48 which is welded to longitudinal stretcher 49. As best illustrated in FIG. 7, the horizontally extending gusset 48 is comprised of first and second gusset plates 50 and 51 which, when sandwiched together, partially encompass longitudinal stretcher 49. Placing the pair of horizontally displaced keyways 45 and 46 in a single horizontally extending gusset 48 simplifies manufacturing problems since, by placing the keyways in a single preformed part, the keyways may be accurately formed in the gusset and the gusset may then be attached to the seat frame without further concern over the relative placement of the keyways. Additionally, the horizontally extending gusset 48 serves to reenforce the fore and aft or longitudinally, extending stretchers adjacent the wall of the vehicle in a manner that prevents bowing of these stretchers during impact. Bowing of the structures during impact is undesirable since bowing could cause a release of the rearmost low post 42 from the keyway 46. Once the low posts 42 and 43 are slidably received in the keyways 45 and 46, the low posts are permanently secured therein by a pair of locking plates 53 and 54, respectively. The locking plates 53 and 54 include apertures 55 and 56 through which the low posts 41 and 42 extend. The locking plates are then bolted at 57 or otherwise suitably secured to the gusset 48 to fix the position of low posts 41 and 42 in keyways 45 and 46.

Referring now specifically to FIG. 1, it is illustrated that the vehicle seat 10 is comprised of a bench portion 14 including fore and aft or longitudinally extending stretchers 60 and 61 and side-to-side or transversely extending stretchers 64 and 65. Side frame members 49 and 68 serve as longitudinal end stretchers of the bench as well as serving as the primary structural members of the upright back 11. Horizontally extending gussets 48 and 69 are provided on the bench portions of the side frame members 49 and 68, respectively to prevent buckling of the bench during impact. The upright back 11 further includes a top transversely extending stretcher 70 which interconnects the topmost portion of side frame members 49 and 68. The upright back portion 11 further includes a generally vertically extending center strap 71 interconnecting the top stretcher 70 and the longitudinally extending stretcher 65 of the bench 14. The back 11 also includes a diagonally extending strap 72 interconnecting side frame member 49 with the side frame member 68 at 73 and 74, respectively. The diagonally extending strap 71 eliminates parallelograming of the back portion 11 as well as improving its torsional rigidity. The straps 71 and 72 are welded together at their crossing point 75 and are welded to the stretchers and side frame members. A suitable material for the straps 71 and 72 has been found to be 11 gauge steel. The diagonal strap 72 is two inches wide and the center strap 71 is one and one-half inches wide. The stretchers and the side frame members are all formed of extruded rectangular steel tubing which is welded together at each intersection of strap, stretcher or side frame member. A suitable material for forming the side frame members and the stretchers of the seat 10 has been found to be 16 and 14 gauge YST steel. This material is a low alloy, high strength, carbon steel which possesses the required strength and resiliency to provide adequate energy absorbtion in a crash situation. 1.0×1.25 inch 16 gauge YST 70 steel tubing has been found to be a suitable material for side frame members 48 and 68 as well as front and rear transversely extending stretchers 64 and 65. Longitudinally extending stretchers 60 and 61 as well as the transversely extending top stretcher 70 are preferably formed of 1.0×1.0 inch 14 gauge YST 70 steel.

The brackets 76 and 77 illustrated only in FIG. 5, are welded to side frame member 68 for supporting side trim members and shell members of the seat 10. It is to be understood that the seat frame illustrated in FIGS. 1, 4 and 5, in actual use, will be provided with a shell and padding which is bolted or otherwise suitably secured to the frame illustrated in these Figures. The front portion of the shell includes pads or suitable cushions, forming a comfortable arrangement for receiving a seated passenger, and the upstanding back portion 11 of the seat includes suitable padding to prevent contusions when a passenger impacts the back of the seat during an accident.

OPERATION

Figure 8:
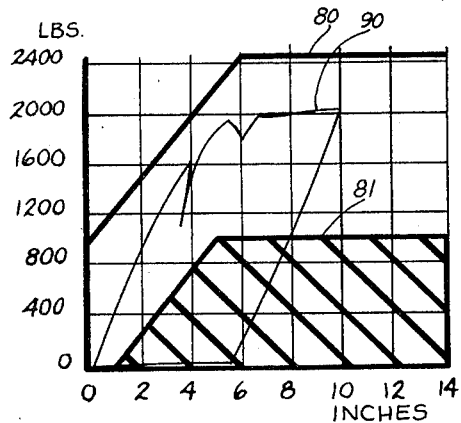
FIG. 8 is a plot of force versus deflection for the window side of a cantilevered seat structure having a seat back rigidly secured to the sidewall of the vehicle.

When seats constructed in accordance with the present invention are installed in a motor vehicle, pairs of seats function to compartmentalize the passengers in a fore and aft direction. In a crash situation, a passenger hurtled forward typically will first impact the lower portion of the front seat with his knees. Next, the head of the passenger will impact the upper portion of the rear surface of the seat back. This impact is then followed by a full body impact against the back of the seat. The aforementioned Department of Transportation Base Line Advanced Design Transit Coach Specifications set forth upper and lower limits with respect to the energy with which the body of the passenger is to absorb during such an impact. Referring to FIG. 8, the energy absorbtion criteria set forth by Department of Transportation specifications are delineated in a plot of force versus deflection in units of pounds and inches of travel. The areas under the curves 80 and 81 represent the energy absorbed by a seat during impact of a bioform. Tests run on specific seat structures designed to meet these specifications are run by slowly pushing a bioform into the rear of a seat while measuring force and deflection. The curve 80 represents the upper limit of the force versus deflection Department of Transportation criteria. Force versus deflection curves for seat configurations that extend over this upper limit are too stiff to prevent internal injuries to the occupant during impact. The lower curve 81 and the shaded area thereunder represent the lower limit of the force versus deflection Department of Transportation criteria. Seat constructions having response curves falling under curve 81 are too flexible to adequately protect and retain the occupants between adjacent seats during an impact. In other words, these seats are too flexible to effectively compartmentalize the passengers between the seats.

The curve 90 in FIG. 8 illustrates the force versus deflection response on the window side of a double occupant seat constructed according to FIG. 1, except that a fixed high post is used to cantilever the seat back from the sidewall of a vehicle in the manner that prior art upper suspension cantilevered seats are mounted. FIG. 8 illustrates that use of a fixed high post to fully cantilever the seat structure of FIG. 1 presents a seat structure that is relatively inflexible on the window side, requiring that the bioform impart relatively high forces to the back of the seat to achieve relatively small deflections. The area under curve 90 represents approximately 8,000 inch-pounds of energy.

Figure 9:
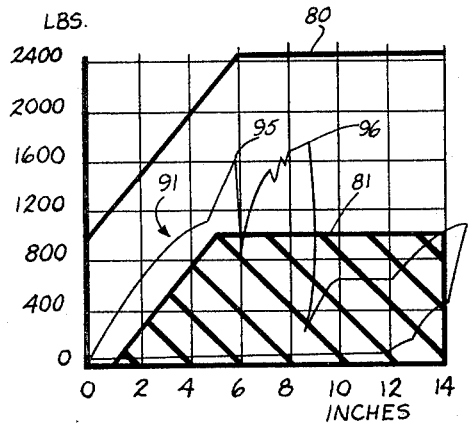
FIG. 9 is a plot of force versus deflection for the window side of a cantilevered seat structure having a seat back mounted to the sidewall of the vehicle with a sliding connection.
Figure 10:
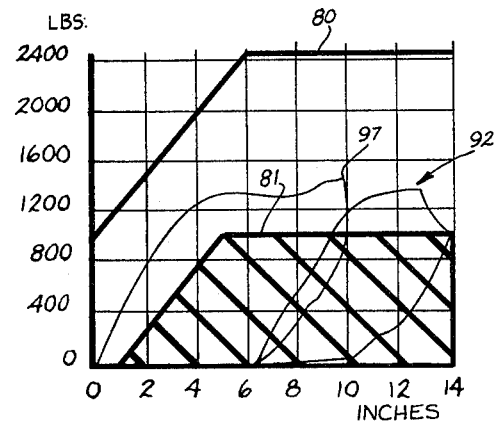
FIG. 10 is another plot of force versus deflection for the window side of a cantilevered seat structure having a seat back mounted to the sidewall of the vehicle with a sliding connection.

Referring now to FIGS. 9 and 10, force versus deflection curves 91 and 92 for the window side of the seat structure of FIG. 1 are illustrated for cases where a purely sliding connection is provided between the top of the seat back and the sidewall of the vehicle. These curves illustrate that provision of a sliding connection at the top of the seat back to achieve a fully cantilevered seat is successful in substantially reducing the maximum forces subjected to the bioform while still absorbing approximately 8,000 inch-pounds of energy. However, the response curves of FIGS. 9 and 10 contain irregularities, for example, at 95, 96 and 97 which indicate that the sliding connection periodically binds in its track due to moments generated in the seat back during impact. It is only vibration or jarring of the structure that eventually caused release and further deflection of the sliding connection. Although, the sliding connection provides an obvious improvement, the sliding connection alone does not provide the best force versus deflection response curves because of the danger of binding due to moments generated in the seat back during impact.

Figure 11:
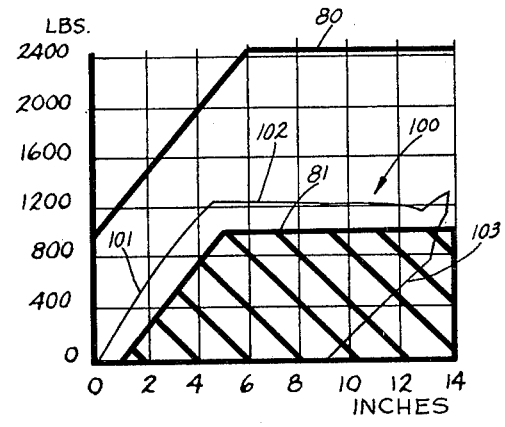
FIG. 11 is a plot of force versus deflection for the window side of a cantilevered seat structure having a back mounted to the sidewall of the vehicle with a sliding and pivoting connection.

Referring now to FIG. 11, a force versus deflection curve 100 for the window side of the seat structure of FIG. 1, is illustrated for the case where a sliding and pivoting connection is provided for attaching the top of the seat back to the sidewall of the vehicle. As illustrated by curve 100, provision of the hinge in the center of the sliding high post eliminates the effect of moments generated in the seat back during impact, allowing translation of the portion of the seat back immediately adjacent the sidewall of the vehicle. In this case, the force versus deflection curve would be virtually the same for both the aisle and window side of the seating arrangement. The portion 101 of curve 100 represents elastic deformation of side frame members 48 and 69 and center strap 71 at the bottom portion 13 of the back 11. The portion 102 of curve 100 represents plastic deformation of these members. Portion 103 of curve 100 represents the return of energy stored in the elastically deformed structure. As clearly illustrated by curve 100 of FIG. 11, with the sliding and pivoting connection, the force versus deflection response curve of the window side of the structure of FIG. 1, provides nearly an optimum force versus deflection response curve. The response curve 100 illustrates that this structure imparts relatively low forces to the bioform, while conforming relatively closely to the lower limits of the Department of Transportation force versus deflection criteria to ensure compartmentalization during an accident. In this case also, the area under curve 100 represents a total of approximately 8,000 inch-pounds of energy absorbed during impact.

The above description should be considered as exemplary and that of the preferred embodiment only. The true spirit and scope of the present invention should be determined by reference to the appended claims. It is desired to include within the appended claims all modifications that come within the proper scope of the invention.

The embodiments of the invention in which an exclusive property or privilege is claimed are defined as follows.

1. A passive restraint for a vehicle comprising:
   a generally upright planar deflectable structure for receiving the impact of a passenger during an accident or a rapid maneuver, said deflectable structure including a top portion and a bottom portion;
   first mounting means for securely mounting said bottom portion of said structure to the vehicle;
   second mounting means for slidably mounting said top portion of said structure to a sidewall of the vehicle, whereby said structure is free to deflect about said bottom portion of said structure to absorb the impact energy of a passenger thereby preventing or reducing serious injury to the passenger during an accident or rapid maneuver; and
   means for pivoting said top portion of said structure about a generally vertical axis, said means for pivoting preventing moments generated in said structure from interfering with the sliding movement of said second mounting means during impact.

2. The passive restraint of claim 1 wherein said structure comprises the upright back of a vehicle seat.

3. The passive restraint of claim 1 wherein said means for securely mounting, securely mounts said bottom portion of said structure to the side of said vehicle to provide a fully cantilevered structure.

4. The passive restraint of claim 1 wherein said second mounting means comprises a foot connected to said structure, said foot being adapted for slidable engagement with a generally fore and aft extending channel disposed in the sidewall of the vehicle.

5. The passive restraint of claim 4 wherein said second mounting means further includes a high post projecting from said foot and a generally vertically extending keyway disposed in said top portion of said structure, said high post being slidably received in said keyway to connect said foot to said structure and absorb vertical deflection between said foot and said structure when said structure deflects.

6. The passive restraint of claim 5 wherein said high post includes said means for pivoting, said means for pivoting comprising a hinge disposed between said foot and said keyway, said hinge preventing moments generated in said structure from interfering with the sliding motion of said foot during impact.

7. The passive restraint of claim 1 wherein said first mounting means comprises a vehicle seat bench cantilevered from a sidewall of the vehicle, said structure comprising a generally upright seat back depending from said bench.

8. The passive restraint of claim 7 wherein said vehicle seat bench includes a horizontally extending gusset, and a pair of horizontally spaced keyways disposed in said gusset, said vehicle seat bench being securely mounted to the wall of the vehicle by a pair of low posts projecting from the wall and received in said keyways.

9. The passive restraint of claim 8 further including a pair of apertured plates for fixing said low posts within said keyways, said apertured plates being disposed over said low posts and secured to said seat bench.

10. An energy absorbing cantilevered vehicle seat for absorbing the impact energy of a passenger in a vehicle during an accident or rapid maneuver, said vehicle seat comprising:
a bench securely mounted to a sidewall of the vehicle;
an upstanding back depending from said bench, said back having a top portion and a bottom portion;
said seat back being plastically deformable at predetermined loads for absorbing the impact energy of a passenger and thus preventing or reducing serious injury to the passenger during an accident;
a load bearing high mounting attachment for suspending said top portion of said seat back to the sidewall of the vehicle;
means for slidably mounting said high mounting attachment to the sidewall of the vehicle, to insure deflection of said seat back in the fore and aft direction about said bench to absorb the impact energy of a passenger and compartmentalize the passenger between adjacent seats, thereby preventing or reducing serious injury to the passenger during an accident or rapid maneuver.

11. The energy absorbing cantilevered vehicle seat of claim 10 further including means for pivoting said top portion of said back about said means for slidably mounting, whereby said means for pivoting prevents moments generated in said structure from interfering with the operation of said means for slidably mounting.

12. The energy absorbing cantilevered vehicle seat of claim 11 wherein said means for pivoting provides for pivoting of said upstanding back about a generally vertical axis.

13. The energy absorbing cantilevered vehicle seat of claim 10 wherein said means for slidably mounting comprises a foot connected to said back, said foot being adapted for slidable engagement with a generally fore and aft extending channel disposed in the sidewall of the vehicle.

14. The energy absorbing cantilevered vehicle seat of claim 13 wherein said means for slidably mounting further includes a high post projecting from said foot and said high mounting attachment comprises a generally vertically extending keyway disposed in said top portion of said back, said post being slidably received in said keyway to connect said foot to said back and absorb vertical deflection between said food and said back.

15. The energy absorbing cantilevered vehicle seat of claim 14 wherein said high post includes a hinge disposed between said foot and said keyway, said hinge preventing moments generated in said back from interfering with the sliding motion of said foot by providing for pivoting of said upstanding back about a generally vertical axis.

16. The energy absorbing cantilevered vehicle seat of claim 10 wherein said bench includes a horizontally extending gusset and a pair of horizontally spaced keyways disposed in said gusset, said bench being securely mounted to the wall of the vehicle by a pair of low posts projecting from the wall and received in said keyways.

17. The energy absorbing cantilevered vehicle seat of claim 16 further including a pair of apertured plates for fixing said low posts within said keyways, said apertured plates being disposed over said low posts and secured to said seat bench.

* * * * *